(12) United States Patent
Bai et al.

(10) Patent No.: US 8,059,012 B2
(45) Date of Patent: Nov. 15, 2011

(54) RELIABLE PACKET DELIVERY PROTOCOL FOR GEOCAST PROTOCOL IN DISCONNECTED VEHICULAR AD HOC NETWORK

(75) Inventors: Fan Bai, Troy, MI (US); Upali Priyantha Mudalige, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 637 days.

(21) Appl. No.: 12/204,850

(22) Filed: Sep. 5, 2008

(65) Prior Publication Data

US 2010/0060480 A1    Mar. 11, 2010

(51) Int. Cl.
G08G 1/00 (2006.01)
H04J 1/16 (2006.01)

(52) U.S. Cl. ........................................ 340/902; 370/230

(58) Field of Classification Search ............... 340/539.1, 340/902, 995.13; 701/19; 370/270, 328, 370/230
See application file for complete search history.

(56) References Cited

U.S. PATENT DOCUMENTS

| | | | | |
|---|---|---|---|---|
| 5,565,858 A * | 10/1996 | Guthrie | ...................... | 340/10.33 |
| 5,774,876 A * | 6/1998 | Woolley et al. | .................. | 705/28 |
| 6,707,378 B2 * | 3/2004 | MacNeille et al. | ........... | 340/435 |
| 7,005,985 B1 * | 2/2006 | Steeves | ...................... | 340/572.1 |
| 7,649,872 B2 * | 1/2010 | Naghian et al. | ............... | 370/338 |
| 7,672,270 B2 * | 3/2010 | Roggero et al. | ............... | 370/328 |
| 2002/0059017 A1 * | 5/2002 | Yamane et al. | .................... | 701/1 |
| 2003/0063015 A1 * | 4/2003 | Ebner et al. | .................... | 340/907 |
| 2005/0088318 A1 * | 4/2005 | Liu et al. | ........................ | 340/902 |
| 2007/0195808 A1 * | 8/2007 | Ehrlich et al. | ................ | 370/408 |
| 2007/0271029 A1 * | 11/2007 | Tzamaloukas | ................ | 701/200 |
| 2008/0247310 A1 * | 10/2008 | Ruffini et al. | ................. | 370/230 |
| 2008/0247353 A1 * | 10/2008 | Pun | ............................... | 370/328 |

* cited by examiner

*Primary Examiner* — Benjamin C Lee
*Assistant Examiner* — Sigmund Tang

(57) ABSTRACT

A method is provided for delivering data messages in an inter-vehicle ad hoc network. The inter-vehicle ad hoc network utilizes a multi-hop routing protocol for storing, carrying forward and distributing a data message to various vehicles traveling along the road. The method includes determining a first cluster consisting of a group of vehicles proximate to one another traversing along a road in a first direction. A determination is made as to which vehicles within the first cluster are trailer vehicles for re-broadcasting messages based on vehicle position within the first cluster. An event is detected in a travel path of the first cluster by one of the vehicles in the first cluster. The event is reported to other vehicles in the cluster. At least one vehicle in a second cluster moving in an opposite direction to the first cluster is detected. The data message is broadcast from the determined trailer vehicles to the second cluster.

24 Claims, 4 Drawing Sheets

RELIABLE PACKET DELIVERY PROTOCOL FOR GEOCAST PROTOCOL IN DISCONNECTED VEHICULAR AD HOC NETWORK

BACKGROUND OF INVENTION

An embodiment relates generally to reliable data message delivery for an ad hoc vehicular network.

Vehicle to vehicle communications are typically used to notify other vehicles of events that are occurring which may directly or indirectly affect vehicles traveling along a road. Vehicles disseminate messages containing information to other vehicles within a broadcast range for notification of the various driving conditions. In the case of vehicle safety applications, the objective of message dissemination is to reduce accidents by forewarning vehicle drivers of such conditions. When a vehicle receives a notification message, the receiving vehicle attempts to re-broadcast the message to other vehicles within its broadcasting range for alerting other vehicles of the existing condition.

The drawback with the above described system is the flooding of messages (e.g., broadcast storm) within the network. When the majority of the vehicles within a broadcast range attempt to re-broadcast messages, the wireless channel becomes overloaded, resulting in packet collision. The result of such an overload is performance degradation that affects communication reliability. Moreover, vehicles traveling behind those vehicles broadcasting the information that are outside of the broadcast range will not obtain such warnings.

SUMMARY OF INVENTION

An advantage of an embodiment of the invention is the reliable and robust packet delivery of data messages by optimizing the number of vehicles re-broadcasting the message so that a selective number of extra redundant packets are transmitted as a tradeoff to improve the reliability of the message transfer, under the scenarios where the vehicles on the same direction are not directly connected. The information is stored, carried forward and continuously transmitted to oncoming vehicles of a roadway so that an ongoing message distribution is maintained over the region of concern for a period of time.

An embodiment contemplates a method of delivering data messages in an inter-vehicle ad hoc network. The inter-vehicle ad hoc network utilizes a multi-hop routing protocol for distributing a data message to various vehicles traveling along the road. The method includes determining a first cluster consisting of a group of vehicles proximate to one another traversing along a road in a first direction. A determination is made as to which vehicles within the first cluster are trailer vehicles for re-broadcasting messages based on vehicle position within the first cluster. An event is detected in a travel path of the first cluster by one of the vehicles in the first cluster. The event is reported to other vehicles in the cluster. At least one vehicle in a second cluster moving in an opposite direction to the first cluster is detected. The data message is broadcast from the determined trailer vehicles to the second cluster.

An embodiment contemplates a vehicular multi-hop message dissemination system for providing redundant message packet delivery in an inter-vehicle ad hoc network. A first vehicle having an on-board broadcasting unit includes a transmitter and receiver for communicating with other vehicles within the inter-vehicle ad hoc network. A global positioning system determines the first vehicle's position. The vehicle communication system exchanges vehicle position data with other neighboring vehicles for determining whether the vehicle is part of a first cluster. The global positioning system further identifies whether the first vehicle is a trailer vehicle within the first cluster. A buffer stores a received data message. A respective data message is communicated to the trailer vehicles in the first cluster. The respective data message is broadcast from a set of trailer vehicles within the first cluster to at least one leading vehicle in a second cluster traversing along the road in an opposite direction of the first cluster.

DETAILED DESCRIPTION

A multi-hop geocast protocol is a known method for the delivery of information to a group of destinations in a wireless ad hoc network. The dissemination of messages packets within an inter-vehicular ad hoc network has typically been dynamic and redundant since each node forwards the messages based strictly on network connectivity. The multi-hop message delivery system described herein provides for a reliable and robust packet delivery even if a message host vehicle exits or its wireless communication is not reliable. Furthermore, the multi-hop message delivery system optimizes the number of vehicles re-broadcasting the message so that only a small number of extra redundant packets (as tolerable) are transmitted as a tradeoff to significantly improve the reliability of the message transfer.

Figure 1:
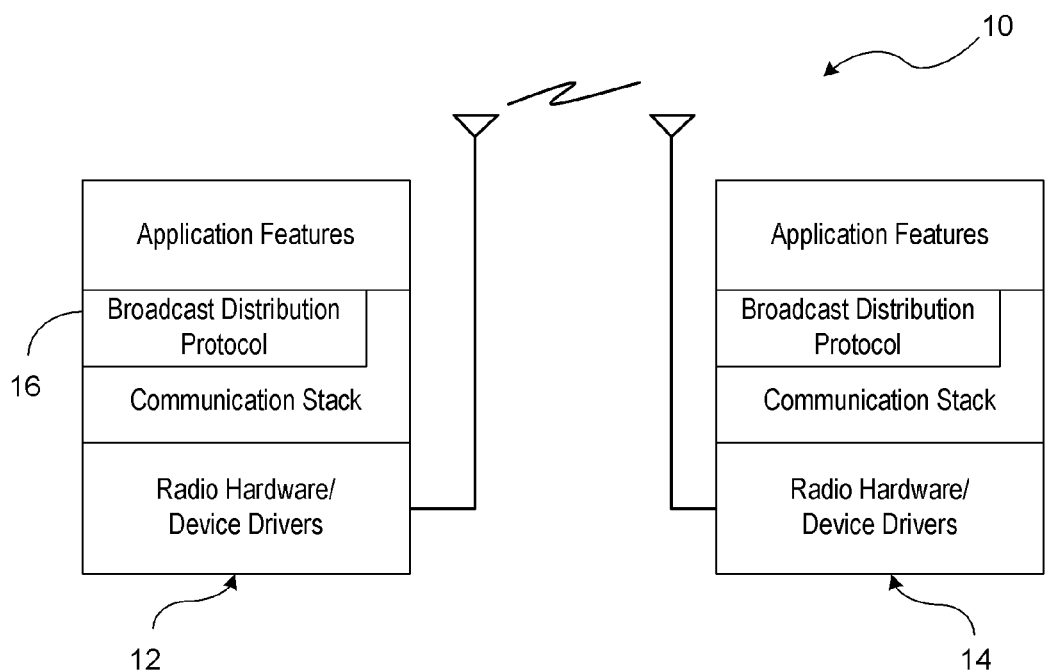
FIG. 1 is a block diagram of the vehicle communication system according to an embodiment of the invention.

FIG. 1 illustrates a block diagram of a vehicle communication system for receiving broadcast message packets, processing the message packets, and for re-broadcasting the message packets. A vehicle communication system 10 having communications devices such as an on-board unit (OBU), for broadcasting message packets between vehicles. A host vehicle OBU 12 is shown communicating with a remote vehicle OBU 14. Each respective OBU includes a broadcast message dissemination protocol 16 for wirelessly distributing the messages.

The message packets are broadcast between the host vehicle OBU 12 and the remote vehicle OBU 14 via their respective antennas. Message packets are received between vehicles within a cluster or between vehicles of two respective clusters that are within broadcast range of each other. The system may use a dedicated short range communication protocol (DSRC), WiFi, or like system, as the communication protocol. The advantage of using the DRSC protocol is that it is designed and licensed for public safety applications. A typical message packet may contain the exact location of the vehicle broadcasting the message, thus providing a means for the vehicle receiving the message to know its exact relative location with respect to the broadcasting vehicle(s).

Figure 2:
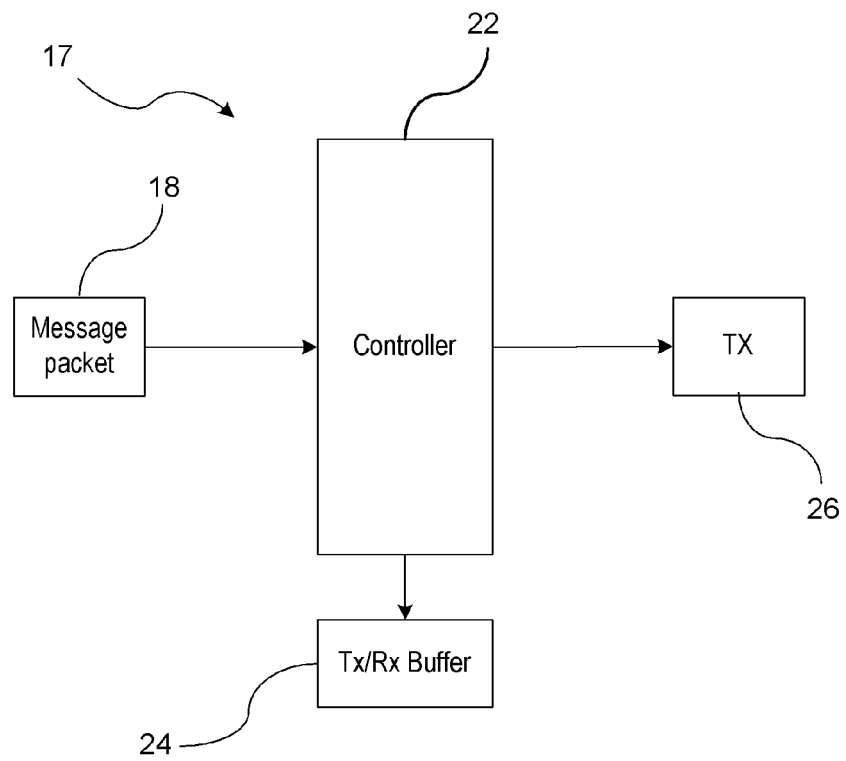
FIG. 2 is a block diagram of the vehicle broadcast message dissemination system according to an embodiment of the invention.

A broadcast message dissemination system 17 is shown in greater detail in FIG. 2. Incoming data packets are received via a respective antenna and are processed by the respective hardware and driver devices of the radio receiver and communicated to the receiving stack where the incoming data packets are received at 18.

The message data packet is provided to a controller 22. The controller 22 determines whether the vehicle is a candidate vehicle for re-broadcasting the data message according to the broadcast distribution protocol.

A receiving and transmitting buffer 24 is provided for storing incoming messages prior to re-broadcasting. The message packets stored in the buffer 24 are maintained in the buffer 24 until a respective message is either re-broadcast by the transmitter 26 or canceled based on the controller 22 determining whether the vehicle is a candidate vehicle (i.e., trailer vehicle or leader vehicle in a cluster).

Figure 3:
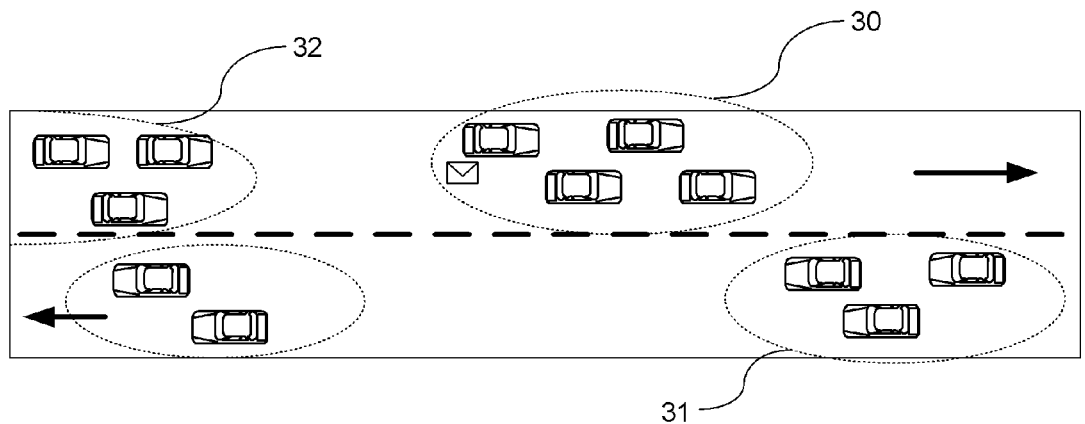
FIG. 3 is an illustration of vehicle clusters traversing along a vehicle road according to an embodiment.

FIGS. 3-8 illustrate the broadcast distribution of the data message between respective vehicle clusters. In FIG. 3, vehicle clusters are formed by groups of vehicles traveling in close proximity to one another along a vehicle roadway in a same direction. The clusters are determined based on the vehicles global position relative to one another. The global position of each vehicle is determined by a global positioning system. Each vehicle periodically transmits a beacon message that includes its global position to neighboring vehicles. Based on the position data contained in each beacon message, each vehicle can determine which vehicle cluster it is a member of and its global position within the vehicle cluster relative to its neighboring vehicles.

FIG. 3 illustrates a first cluster 30, a second cluster 31, and a third cluster 32 formed by vehicles traversing along a road. A respective cluster is formed by one or more vehicles with each cluster being spaced at least a predetermined distance from one another traveling in a same direction along the road.

At least one vehicle in cluster 30 contains a data message concerning an event that is occurring at a location forward of cluster 30. The data message may be warnings that include, but are not limited to, traffic congestion, accidents, slow/stopped vehicles ahead, a post crash notification warning, working zone warning, and visibility enhancement data for pedestrians/cyclists.

The data message is an event that is sensed by one of the respective vehicles within cluster 30 or may be a message received by an entity outside of cluster 30. Upon a respective vehicle sensing an event or receiving a data message regarding the event, the respective vehicle will replicate the data message to each of the vehicles within cluster 30 since each vehicle within the cluster 30 may be directly or indirectly affected by the event.

Each of the vehicles in cluster 30 executes a broadcast distribution protocol which in cooperation with the global positioning system determines whether a respective vehicle is one of the trailer vehicles within cluster 30. Each vehicle in a respective vehicle cluster periodically broadcasts (e.g., 2 sec) their global position via a beacon message. The broadcast distribution protocol provides the number of vehicles that will be designated as trailer vehicles that are broadcasting within cluster 30. This can be solved for by satisfying the following formula:

$$P_s = (1-(1-p)^M)^2$$

where M is the number of trailer vehicles in the cluster contaminated with the data message ready for re-broadcasting the data message, p is the probability that a respective vehicle in the cluster traversing along the road in the first direction can reliably relay a data message to a respective vehicle in an oncoming cluster, and $P_s$ is the probability of a successful transmission broadcast from M number of vehicles to the respective vehicles of the oncoming cluster.

To obtain at least a predetermined probability of success (e.g., $P_s$=0.95), a number M is selected that will achieve the predetermined probability of success. It should be noted that the probability of success $P_s$=0.95 is exemplary and may include other values higher or lower than $P_s$=0.95. Given that the broadcast distribution protocol operates identical for each vehicle, the results generated by each vehicle's broadcast distribution protocol will provide identical results (i.e., knowing the number of vehicles in a cluster and the number of vehicles that will be designated trailer vehicles within the cluster). As a result, the broadcast distribution protocol may operate independently of other vehicles while only requiring the global position of other vehicles in the vehicle cluster. In response to determining how many vehicles will be designated trailer vehicles within vehicle cluster 30, each vehicle determines its position relative to other vehicles. The number of vehicles in the back of the cluster 30, as set forth by $M_T$ will be designated as the trailer vehicles. Therefore, each vehicle determines if it is one of last $M_T$ vehicles within cluster 30. The trailer vehicles become host vehicles and retain the data message for future re-broadcasting. The non-trailer vehicles within cluster 30 may retain this information and utilize it accordingly for reacting to the traffic conditions based on the event; however, these vehicles are not required to retransmit the data message to other respective clusters.

Figure 4:
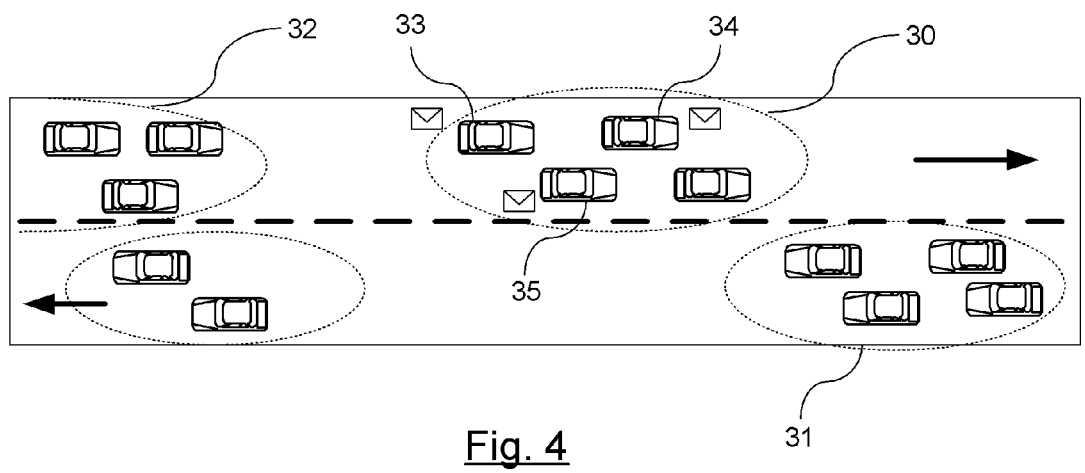
FIG. 4 is an illustration of message replication within a vehicle cluster traversing along a vehicle road according to an embodiment.

FIG. 4 illustrates the designated vehicles for broadcasting the data message from vehicle cluster 30. For a scenario where $M_T$=3, the last three vehicles in cluster 30, specifically vehicles 33, 34, and 35, are designated as trailer vehicles. These respective vehicles function as host vehicles for maintaining the data message in their respective buffer until an oncoming cluster is encountered and re-broadcasting of the data message is demanded. As cluster 30 traverses along the road in a first direction, cluster 31 traveling along the road in an opposite direction to cluster 30 is detected by the vehicles of cluster 30, in response to detecting cluster 31, the trailer vehicles 33, 34, and 35 broadcast the data message to cluster 31.

Figure 5:
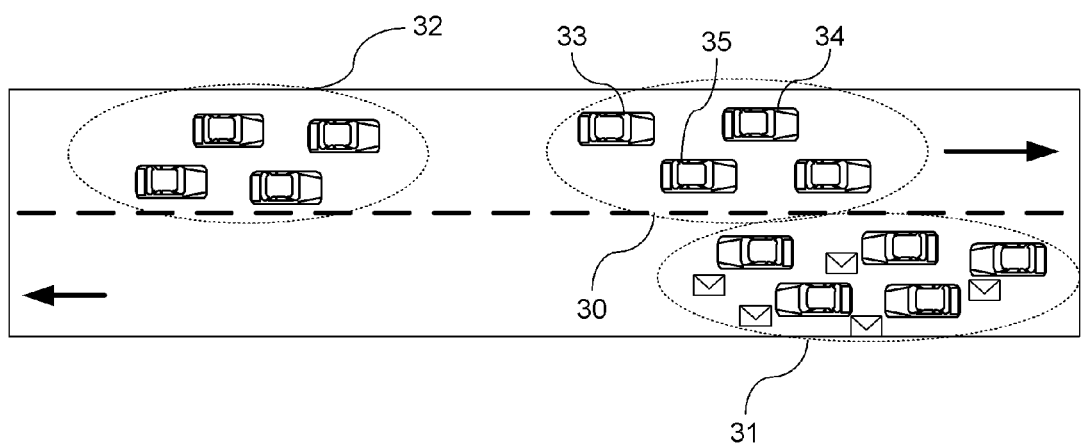
FIG. 5 is an illustration of message broadcast to an oncoming vehicle cluster according to an embodiment.

Similar to the protocol distribution process as described for cluster 30, the broadcast distribution protocol of each of the vehicles in cluster 31 determines a respective number of leading vehicles ($M_L$) that will be required to re-broadcast the data message to achieve a respective probability of success for the data message broadcast. Each of the vehicles in cluster 31 determines their respective global position in the cluster in response to beacon messages transmitted by each of the vehicles within vehicle cluster 31. The broadcast distribution protocol executed by each vehicle within vehicle cluster 31 determines how many vehicles will be designated leading vehicles $M_L$. A leading vehicle is a vehicle that is positioned within $M_L$ number of vehicles in the front of cluster 31. Based on the global positioning of each respective vehicle, a respective vehicle will designate itself as a leading vehicle if it is within one of the $M_L$ number of vehicles within the front of the cluster 31. FIG. 5 illustrates the transfer of the data message from the trailing vehicles 33, 34, 35, of cluster 30 to the vehicles of oncoming cluster 31. Each vehicle of cluster 31 within the broadcasting range of the trailing vehicles of cluster 30 will receive the data message.

Figure 6:
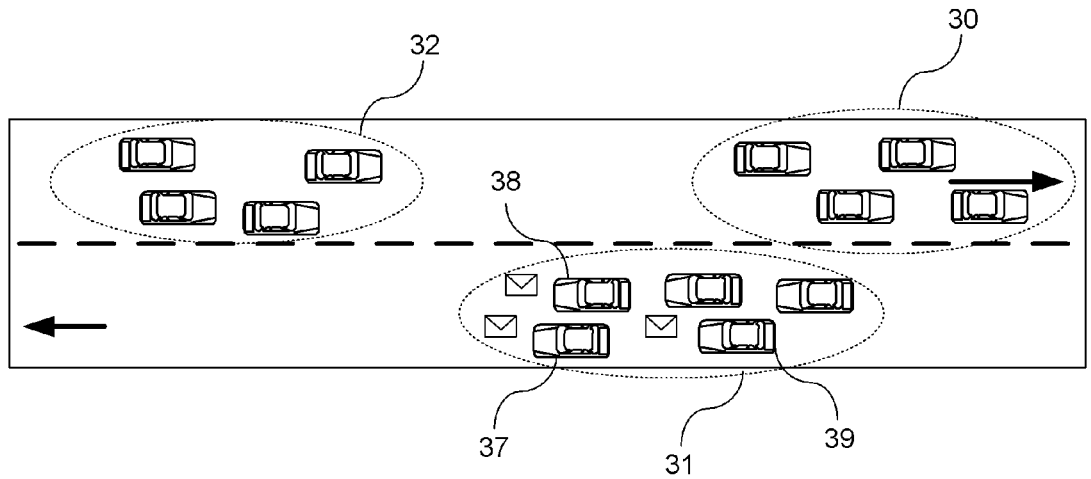
FIG. 6 is an illustration of message replication to lead vehicles within an oncoming vehicle cluster according to an embodiment.

FIG. 6 illustrates the retention of the data message by the leading vehicles of cluster 31, specifically, 37, 38, and 39. The trailing vehicles of cluster 31 will ignore the data message since these vehicles are neither designated for re-broadcasting the data message nor are the notification of the event a concern for these vehicles since they are traveling away from the event.

Figure 7:
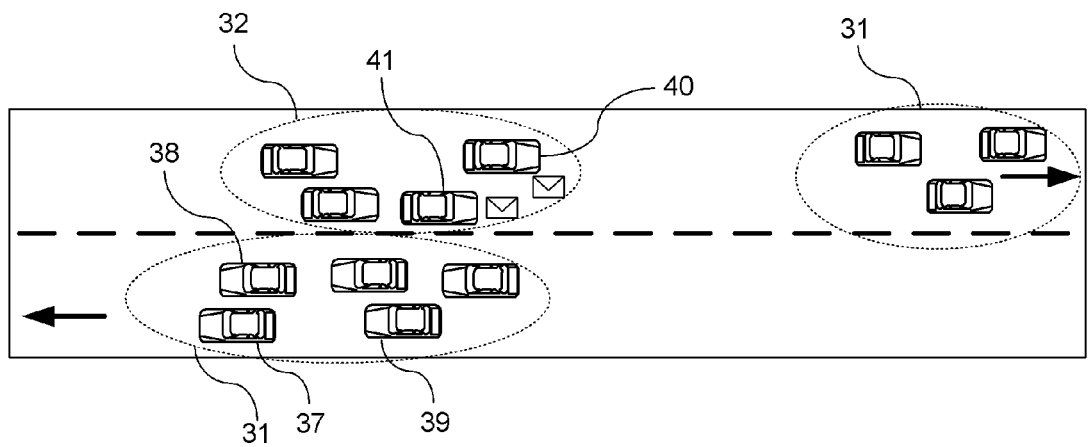
FIG. 7 is an illustration of message broadcast to a next oncoming vehicle cluster group according to an embodiment.
Figure 8:
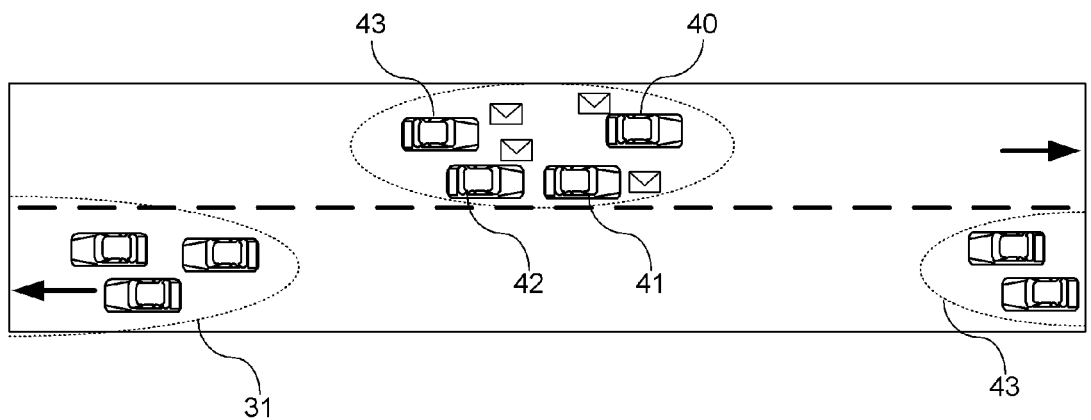
FIG. 8 is an illustration of message replication to lead vehicles within the cluster according to an embodiment of the invention.
Figure 9:
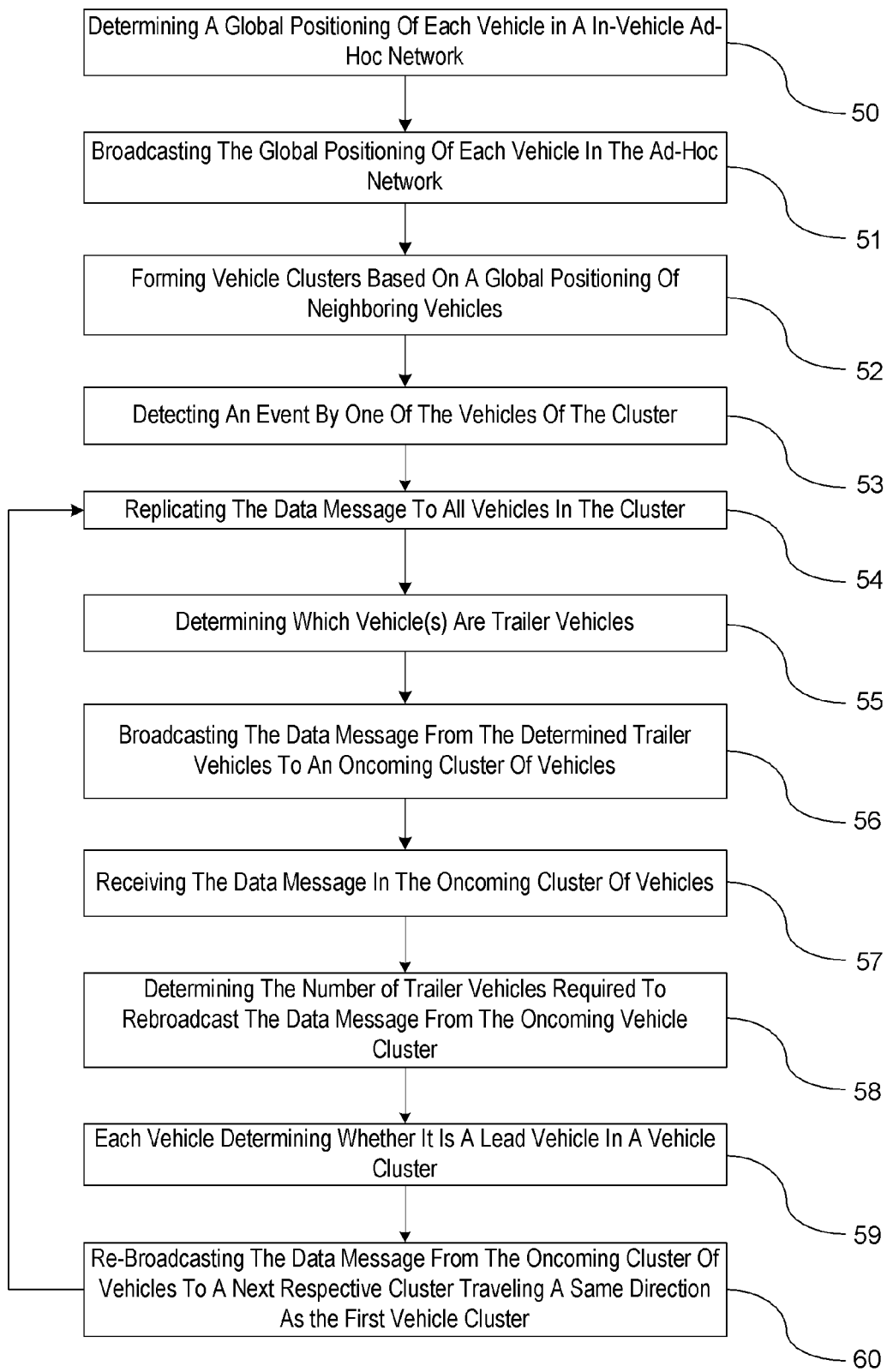
FIG. 9 is a flowchart of a method for message dissemination within an ad hoc vehicle communication network.

FIG. 7 illustrates the broadcast of the data message from the leading vehicles of cluster 31 to the vehicles of cluster 32. The leading vehicles 37, 38, and 39 broadcast the data message to vehicle cluster 32 traveling in an opposite direction to vehicle cluster 31. Any of the vehicles of cluster 32 within a broadcast range of the leading vehicles 37, 38, and 39 will receive the data message. After the data message is received by vehicles within cluster 32 (e.g., vehicles 40, 41), the data message is replicated to all the vehicles within cluster 32. The data message is pertinent to all the vehicles within cluster 32 as each of the vehicles will process the event information contained within the data message as it may impact each respective vehicle since the event has occurred in the road in the direction which cluster 32 is traveling. As discussed earlier, the broadcast distribution protocol will be executed by each vehicle for establishing the trailer vehicles (e.g., 41, 42, and 43) within cluster 32 so that the data message may be relayed to a next oncoming cluster 43 which will ultimately transfer the message to a next cluster traveling behind and in a same direction as cluster 31 (as shown in FIG. 8). The process of re-broadcasting the message is continuously transmitted until the event is no longer relevant.

The selective broadcast of the data message from leading vehicles and trailing vehicles provides redundant and reliable transmission between the clusters while optimizing the number of broadcasts so that the broadcasting channel(s) are not overly cluttered with redundant transmissions of the data message.

FIG. 8 illustrates a flowchart for a method for disseminating a data message concerning an even to various vehicle clusters traversing along a road. In step 50, the global positioning of each vehicle in an inter-vehicle ad hoc network determines its global positioning. In step 51, each vehicle broadcasts a beacon message that contains information regarding its global positioning to other neighboring vehicles.

In step 52, vehicle clusters are formed based on the global positioning of the neighboring vehicles. A beacon message is continuously transmitted to inform other neighboring vehicles of its presence and whether a vehicle has changed its global position as a result of a change in speed or exiting off a roadway.

In step 53, an event is detected by one of the vehicles in the cluster detecting the event or receiving a data message concerning the event.

In step 54, the data message containing information of the event is replicated to all the vehicles within the cluster. The event is a concern to each of the vehicles in the cluster since each vehicle may encounter the event or may be affected indirectly by the event.

In step 55, a determination is made as to which vehicle(s) is/are a trailer vehicle. A respective trailer vehicle is a host vehicle that maintains the data message for re-broadcasting to other vehicle clusters. In step 56, the data message is broadcast from each of the trailer vehicles of the vehicle cluster traveling toward the event to an oncoming vehicle cluster traveling in the opposite direction.

In step 57 the data message is received by the vehicles of the oncoming cluster. In step 58, a determination is made as to how many lead vehicles of the oncoming cluster are required to re-broadcast the message based on the success probability formula described earlier. In step 59, each vehicle determines whether it is a lead vehicle based on its positioning within the second cluster relative to the other neighboring vehicles.

In step 60, the leading vehicles of the oncoming cluster re-broadcast the message to a next vehicle cluster traveling the same direction as the first vehicle cluster. A return is made to step 54 to replicate the data message to all the vehicles of the next cluster to continue to the re-broadcast distribution routine.

While certain embodiments of the present invention have been described in detail, those familiar with the art to which this invention relates will recognize various alternative designs and embodiments for practicing the invention as defined by the following claims.

What is claimed is:

1. A method of delivering data messages in a inter-vehicle ad hoc network, the inter-vehicle ad hoc network utilizing a multi-hop routing protocol for distributing a data message to various vehicles traveling along the road, the method comprising the steps of:
   determining a first cluster consisting of a group of vehicles proximate to one another traversing along a road in a first direction;
   selecting at least one of the vehicles within the first cluster as a trailer vehicle, the trailer vehicle being a vehicle in a back of the first cluster;
   detecting an event in a travel path of the first cluster by one of the vehicles in the first cluster;
   reporting the event to a plurality of other vehicles in the cluster by the vehicle detecting the event;
   detecting at least one vehicle in a second cluster moving in an opposite direction to the first cluster;
   broadcasting the data message from at least one determined trailer vehicle to the second cluster;
   receiving the data message in the second cluster; and
   determining which vehicles in the second cluster are lead vehicles for re-broadcasting the received data message.

2. The method of claim 1 further comprises the steps of:
   re-broadcasting the data message from the determined lead vehicles of the second cluster to a third cluster of vehicles traversing the direction of the first cluster.

3. The method of claim 1 wherein the trailer vehicles are host vehicles for retaining the data message in a buffer for future broadcast.

4. The method of claim 1 wherein each respective vehicle within a respective cluster periodically transmits a beacon message to neighboring vehicles for identifying its global position.

5. The method of claim 1 wherein vehicle kinematic information is also broadcast within the respective beacon message.

6. The method of claim 1 wherein a number of vehicles in the first cluster identified as trailer vehicles equals an optimal setting value derived from analytical modeling.

7. The method of claim 6 wherein the optimal setting value is derived from the following formula based on a target probability:

$$P_s = (1-(1-p)^M)^2$$

where M is the number of trailer vehicles in the cluster contaminated with the data message and are re-broadcasting the data message, p is the probability that a respective vehicle in the first cluster traversing along the road in the first direction can reliably relay a data message to a respective vehicle in the second cluster, and $P_s$ is the target probability expected to achieve a successful transmission from M number of vehicles to the respective vehicle of an oncoming cluster.

8. The method of claim 7 wherein the target probability is at least 90%.

9. The method of claim 8 wherein the target probability is about of at least 95% is identified as a successful probability for broadcasting the data message in response to the number of trailer vehicles selected for broadcasting the data message.

10. The method of claim 1 wherein the data message is a slow vehicle ahead warning message.

11. The method of claim 1 wherein the data message is a post crash notification warning message.

12. The method of claim 1 wherein the data message is a traffic congestion message.

13. The method of claim 1 wherein the data message is an accident message.

14. The method of claim 1 wherein the data message is a working zone warning message.

15. The method of claim 1 wherein the data message is a visibility enhancement data message for pedestrians/cyclists.

16. A vehicular multi-hop message dissemination system in a vehicle for providing redundant message packet delivery in an inter-vehicle ad hoc network, the system comprising:
   an on-board broadcasting unit including a transmitter and receiver for communicating with other vehicles within the inter-vehicle ad hoc network;
   a global positioning system for determining the vehicle's position, the vehicle communication system adapted to exchange vehicle position data with other neighboring vehicles for determining whether the vehicle is part of a first cluster; and
   a buffer for storing a received data message;
   wherein the on-board broadcasting unit further includes a controller for determining whether the vehicle qualifies as a trailer vehicle within the first cluster, the trailer vehicle being a vehicle in a back of the first cluster, wherein when the controller determines the vehicle is a trailer vehicle and when a respective data message is received, then the respective data message is broadcast by the on-board broadcasting unit to at least one leading vehicle in a second cluster traversing along the road in an opposite direction of the first vehicle cluster.

17. The vehicular multi-hop message dissemination system of claim 16 wherein the on-board broadcasting unit further comprises a controller using a broadcast distribution protocol for controlling the broadcast of the data message from trailer vehicle.

18. The vehicular multi-hop message dissemination system of claim 17 wherein the determination of whether a respective vehicle within the first cluster is a respective trailer vehicle is based the position of the vehicle within the first cluster and a respective number of vehicles that are designated as trailer vehicles as determined by the controller.

19. The vehicular multi-hop message dissemination system of claim 18 wherein an optimum number of trailer vehicles used to successfully broadcast the vehicle message is derived from the following formula based on a target probability:

$$P_s = (1-(1-p)^{M_T})^2$$

where M is the number of trailer vehicles in the cluster contaminated with the data message and are re-broadcasting the data message, p is the probability that a respective vehicle in the first cluster traversing along the road in the first direction can reliably relay a data message to a respective vehicle in the second cluster, and $P_s$ is the target probability.

20. The vehicular multi-hop message dissemination system of claim 19 wherein a probability of at least 90% is identified as a successful probability for broadcasting the data message in response to the number of trailer vehicles selected for broadcasting the data message.

21. The vehicular multi-hop message dissemination system of claim 20 wherein a probability of at least 95% is identified as a successful probability for broadcasting the data message in response to the number of trailer vehicles selected for broadcasting the data message.

22. The vehicular multi-hop message dissemination system of claim 16 wherein the at least one leading vehicle in a second cluster traversing along the road in the opposite direction further comprises:
   on-board broadcasting unit including a transmitter and receiver for communicating with other vehicles within the inter-vehicle ad hoc network; and
   a global positioning system for determining the vehicle global position,
   wherein the on-board broadcasting unit further includes a controller for exchanging vehicle position data with other neighboring vehicles within the second cluster for determining whether the vehicle is part of a second vehicle cluster, the controller further identifying whether the first vehicle is a leading vehicle within the second vehicle cluster for re-broadcasting the data message to a third cluster traversing along the road in a same direction as the first cluster.

23. The vehicular multi-hop message dissemination system of claim 22 wherein an optimum number of lead vehicles used to successfully broadcast the vehicle message is derived from the following formula based on meeting a target probability:

$$P_s = (1-(1-p)^{M_L})^2$$

where $M_L$ is the number of lead vehicles in the second cluster contaminated with the data message and are re-broadcasting the data message, p is the probability that a respective vehicle in the second cluster traversing along the road in the second direction can reliably relay a data message to a respective vehicle in a third cluster, and $P_s$ is the target probability.

24. The vehicular multi-hop message dissemination system of claim 23 wherein the target probability is at least 90%.

* * * * *